United States Patent [19]

Hays, Jr.

[11] Patent Number: 4,748,193
[45] Date of Patent: May 31, 1988

[54] FRICTION MATERIAL

[75] Inventor: William D. Hays, Jr., Ballston Spa, N.Y.

[73] Assignee: Allied Corporation, Morristown, N.J.

[21] Appl. No.: 912,432

[22] Filed: Sep. 29, 1986

[51] Int. Cl.$^4$ .......................... C08K 3/08; C08K 7/02; C08L 21/00; C08L 61/06

[52] U.S. Cl. .................................... 523/156; 523/155; 523/157; 523/158; 524/439; 524/440; 524/441

[58] Field of Search ............... 523/152, 157, 158, 156, 523/155

[56] References Cited

U.S. PATENT DOCUMENTS 3,835,118  9/1974  Rhee et al. ........................ 523/155
3,845,008 10/1974  Mitchell, III ...................... 523/157
4,075,142  2/1978  Morse et al. ....................... 523/157
4,369,263  1/1983  Matsushima et al. ............... 523/157
4,605,105  8/1986  Ogiwara ............................. 523/152

FOREIGN PATENT DOCUMENTS 2516385 10/1975 Fed. Rep. of Germany ...... 523/152
57-11428  8/1962 Japan .................................. 523/152

Primary Examiner—Allan M. Lieberman
Attorney, Agent, or Firm—Leo H. McCormick, Jr.; Ken C. Decker

[57] ABSTRACT

A composition of matter for use as a friction material having soft malleable metallic (zinc) powder therein to attenuate low frequency vibrations that produce undesirable noise during a brake application.

7 Claims, 3 Drawing Sheets

FIG. 2

FORMULA WEIGHT %

| | X | A | B | C | D | E | F |
|---|---|---|---|---|---|---|---|
| *METALLIC POWDERS | 1 | 1 | 1 | 1 | 1 | 1 | 1 |
| SPONGE IRON | 38 | 31 | 44 | 41 | 33 | 31 | 35 |
| STEEL FIBER | 20 | 16 | 15 | 14 | 15 | 16 | 19 |
| ∝ INORGANIC FILLER | 7 | 5 | 7 | 6 | 7 | 5 | 6 |
| ⍭ ORGANIC FILLER | 4 | 4 | 3 | 2 | 3 | 4 | 4 |
| ᵚ FRICTION MODIFIERS | 20 | 16 | 15 | 15 | 17 | 16 | 18 |
| PHENOLIC RESIN | 10 | 8 | 7 | 7 | 9 | 8 | 9 |
| ZINC POWDER | | | 8 | 14 | 15 | 19 | |
| ALUMINUM POWDER | | | | | | | 8 |
| TIN POWDER | | 19 | | | | | |

\* IRON, COPPER
∝ BARYTES, WHITING, TALC, ROTTENSTONE, ETC.
⍭ ELASTOMERIC MATERIALS, NATURAL & SYNTHETIC RUBBER, LATEX, ETC.
ᵚ SILICA, MAGNESIUM OXIDE, ZIRCON, MULLITE, ALUMINA, BARIUM SULFIDE, IRON OXIDE, ETC.

FIG. 1

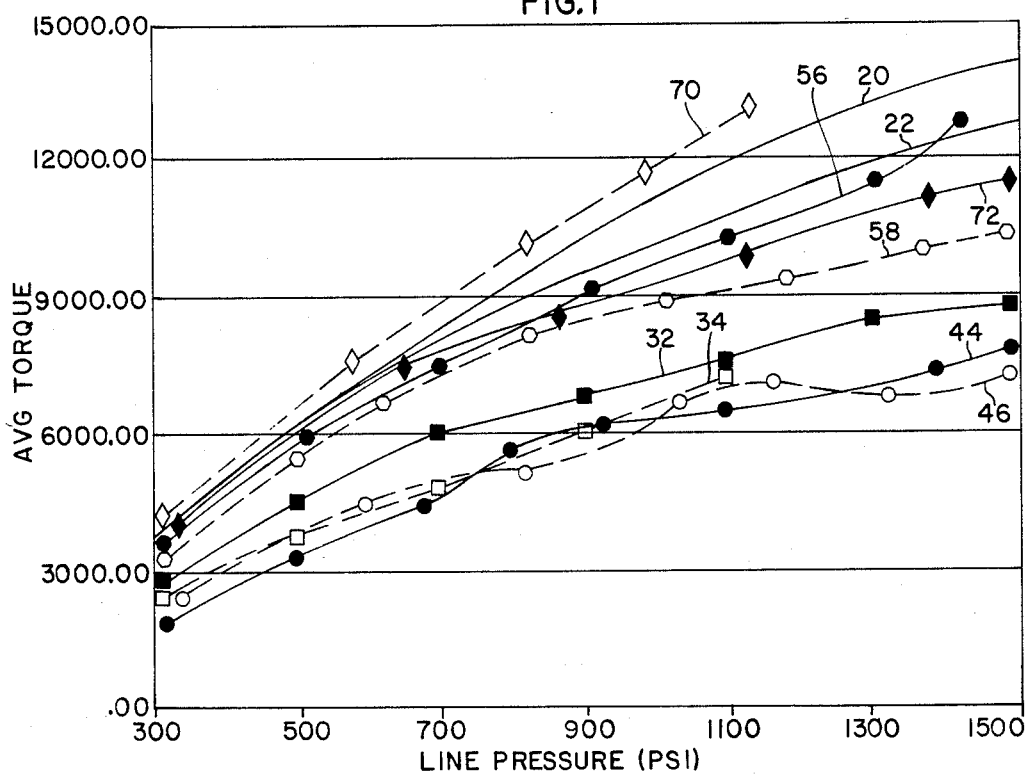

FIG. 2

FRICTION MATERIAL

This invention relates to a composition of matter having from 4–10% by by volume which equates to 8–19% weight of zinc powder therein to attenuate low frequency vibrations when the composition of matter is used as a friction material.

Noise generated during a brake application has been increasing as the size of vehicles has been decreasing. Attempts have been made to mask the noise through the use of sound absorption coatings, such as the coating applied to the back side of a friction pad disclosed in U.S. Pat. No. 3,998,301. While such coatings are effective, the addition of the coating adds cost to the manufacture and at times because the thickness of the coating has not been uniform or did not cover the entire back side of a pad, undesirable noise may still occur.

In order to eliminate the coating, it was suggested in U.S. Pat. No. 4,154,322 to place a screen on the back side of the pad to absorb noise. This solution has not received customer acceptance since it too adds cost to the brake lining without providing any increase in braking efficiency.

Another attempt to reduce noise was the addition of a wiper member to the friction pad disclosed in U.S. Pat. No. 4,315,563. This patent suggested that the creation of oxides on a rotor during a brake application effected the development of the coefficient of friction in such a manner that noise would not be created during a later brake application. Since the wiper member is of a different material than the remainder of the friction material in the pad, it too resulted in a more costly brake pad.

In copending U.S. patent application Ser. No. 596,176 filed Apr. 2, 1984, now U.S. Pat. No. 4,705,146, a method is disclosed on how to select the length of a brake pad to substantially eliminate the creation of undesirable noise. This process could be a valuable tool if a new brake were to be designed. Unfortunately, in currently operating vehicles the brake systems have already been designed without regard to most noise problems.

In a study relating to how noise generation is produced during a brake application, it was discovered that low frequency vibrations were introduced into the entire brake system during certain brake applications. During such brake applications, the caliper often vibrated at a low frequency just prior to stopping and upon release causing audible noise. This type of noise has become known as "creep groan", "stop light crunch" or "release crunch" by the industry.

In an effort to reduce low frequency vibrations through a modification of the ingredients in the composition that makes up the friction material for the brake pad, it was found that a substitution that reduced low frequency vibrations often increased high frequency vibrations.

After many attempts to reach a compromise position to minimize stop light crunch while keeping squeal at an acceptable level, the composition of matter in this invention was developed. The use of trace amounts (less than 2% by weight) of zinc in composition used in friction materials was known however due to the price of zinc in comparison with other metallic powders, large amounts of zinc were not normally used in friction linings. The composition of matter that was finally determined to achieve a noticeable improvement in the elimination of stop light crunch or low frequency vibration during a brake application included zinc in a range of 4–10% by volume which equals to 8–19% by weight of the total composition. The addition of zinc to a friction material in the range set forth above did not substantially change the friction characteristics of the friction material however the noise level was substantially reduced.

It is an object of this invention to reduce the development of low frequency vibrational noise during a brake application through the addition of zinc powder to a metallic based friction lining composition.

An advantage of this invention occurs through the use of zinc powder to a composition of matter used as a friction lining since low frequency vibratory noise is substantially attenuated to a level which is acceptable to most operators.

These objects and advantages should be apparent from reading this specification while viewing the drawing wherein:

FIG. 1 is a table illustrating various compositions investigated during the development of the invention herein disclosed;

FIGS. 2, 3 and 4 are graphs comparing torque to line pressure for various compositions of matter set forth in FIG. 1.

In order to evaluate the invention disclosed herein a typical composition of matter of the type disclosed in U.S. Pat. No. 3,835,118 and identified in FIG. 1 as composition X was made. In this composition, the ingredients are mixed together and the resin cured to form a matrix. Composition X is similar to the friction material disclosed in U.S. patent application Ser. No. 882,645 filed July 7, 1986, in that the reinforcing of the resulting friction pad is made up of steel fiber while sponge iron is the primary friction ingredient.

Brake pads made from composition X were placed on a 1984 Ford Escort and sound measuring equipment was installed to measure noise generated during a brake application. Since this investigation is related to low frequency vibration and noise associated therewith, the test was conducted in a large warehouse to avoid the introduction of outside noise to the test. Brake applications were conducted with the brake rotor and pad having ambient temperature approximately 100° F., 250° F. and 500° F. and brake line pressure at 50, 100, 200, 300 and 400 psi while pulling the vehicle at a constant velocity of 8 ft./minute in a stop and go manner to simulate creep groan, stop light crunch and release crunch. The measured noise was recorded and shown by curves 82, 82' and 82" in FIG. 5. The test was repeated and as shown by curve 83, 83' and 83" in FIG. 5, the same sound characteristics were evident during each application.

From tests I performed with the baseline composition, it was my opinion that a substitution of the metallic content and particularly the sponge iron with a softer material may provide a reduction in the low frequency vibration. The sponge iron content in composition X replaced with an equal volume percent of tin powder to produce composition A shown in FIG. 1. Composition A was made into brake pads for the 1984 Escort and the noise test performed in the same manner as with composition X.

Figure 5:
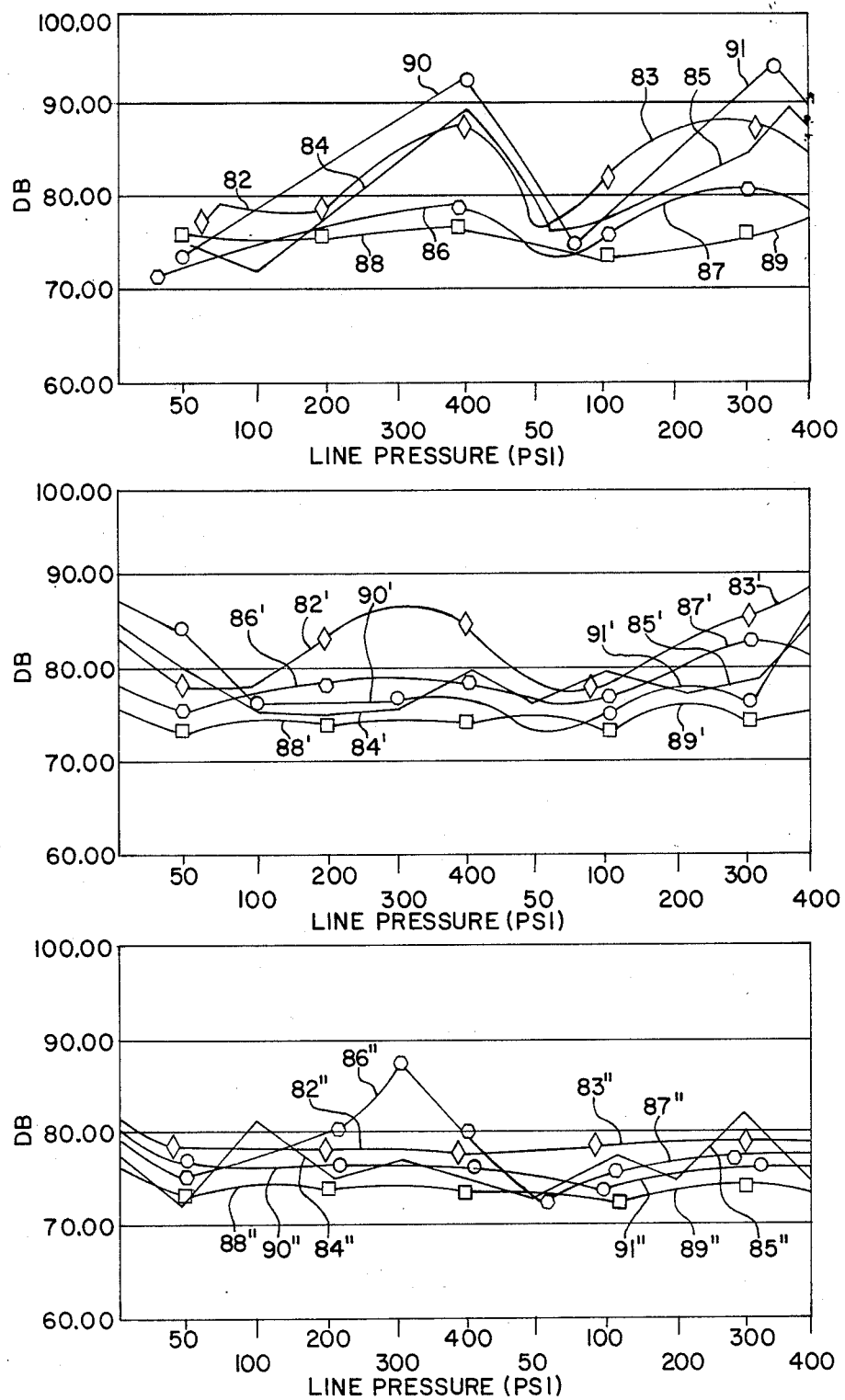
FIG. 5 is a graph comparing low frequency noise (below 500 Hz) with respect to line pressure for various compositions of matter set forth in FIG. 1.

Curves 84, 84', 84" and 85, 85' amd 85" in FIG. 5 illustrates the measured noise developed by composition A during te noise test. It was observed that composition A provided an improvement over noise when the brakes were above 250° F., however the noise level at 100° F. was slightly greater than composition X. It was my opinion that the volume percentage of tin was too high and as a result the volume percent should be reduced by fifty percent.

The tin in composition A replaced with about fifty percent less zinc to produce composition B shown in FIG. 1.

Composition B was made into brake pads for 1984 Ford Escort and the noise test performed on composition X carried out in the warehouse in the same manner.

Curves 86, 86', 86" and 87, 87' and 87" shown in FIG. 5 illustrates the measured noise developed by composition B during the noise test. As can be seen during all phases of this noise test there was an improvement over the base line composition X. However at brake line temperature above 250° F. there was some noise and during the first test at 500° F. more noise than the base line. As a result it was decided to modify composition B by increasing the zinc powder by about fifty per cent to produce composition C shown in FIG. 1.

Composition C was made into brake pads for the 1984 Ford Escort and the noise test performed on composition X carried out. Curves 88, 88', 88" and 89, 89' and 89" shown in FIG. 5 illustrate the measure noise developed by composition C during the noise test. As can be seen in FIG. 5, noise is substantially constant (about 75 Db) which would indicate that the low frequency vibration has been substantially eliminated.

In order to duplicate this test and evaluate the sensitivity of zinc powder in a particular composition, about 25% by volume of the sponge iron was removed from composition C and the remaining ingredients proportionally increased to produce composition D shown in FIG. 1. Brake pads were made from composition D and placed on the 1984 Ford Escort to carry out the noise test. Curves 90, 90', 90" and 91, 91' and 91" in FIG. 5 illustrates the measured noise for composition D during the noise test. As can be seen in FIG. 5, in both compositions A and D there is a substantial decrease in noise when compared with the base line with the brake operating in the 250° F. range and above. For a reduction in a low vibration frequency noise, the soft metallic component performed better when the metallic component was about four volume percent or eight weight percent as in composition C.

As with all compositions, a change in one characteristic can result in some unexpected happenings in other areas. Therefore in order to evaluate the effectiveness of the composition of matter of this invention, a dynamometer test based on SAE test J843D was performed (no water tests were performed). In this test, brake pads are placed on an inertia dynamometer and evaluated for effectiveness by measuring the torque required to bring a simulated vehicle to a stop from speeds of 30 and 60 mph in response to a set input line pressure. Torque is defined as the ratio of the average torque to line pressure times the area of the wheel cylinder for the simulated vehicle under evaluation. A higher value of torque indicates a more effective lining material. Differences in torque from stop to stop reveal change in friction lining, such that, as a lining fades, torque decreases.

Brake pads made of composition X were placed on an inertia dynamometer and the modified J843D effectiveness test carried out.

Figure 3:
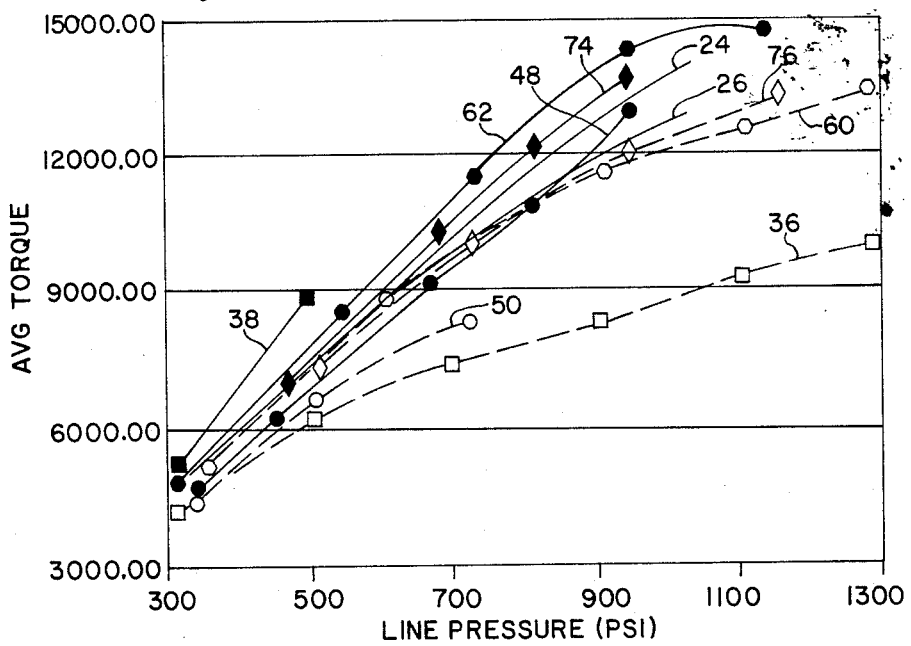
Figure 4:
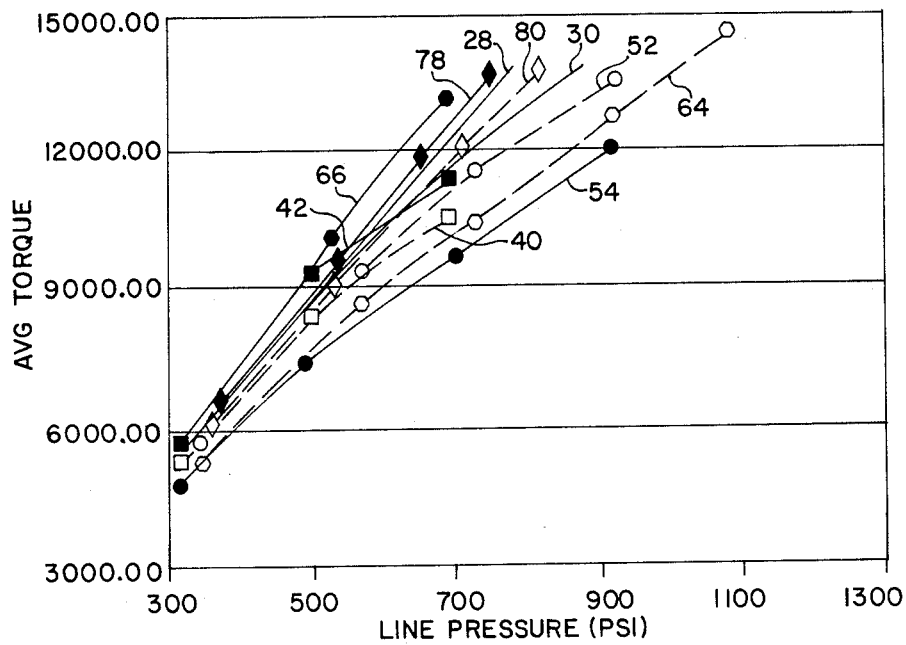

Curves 20 an 22 in FIG. 2 illustrate the torque developed at 30 and 60 mph under pre-burnish speed conditions; curves 24 and 26 in FIG. 3 illustrate the torque developed at 30 and 60 mph under burnish speed conditions; and curves 28 and 30 in FIG. 4 illustrate the torque developed at 30 and 60 mph under final speed conditions for the base line or composition X.

Since composition D showed the greatest reduction in low frequency vibration, brake pads of composition D were tested on the inertia dynamometer in accordance with the modified SAE J843D test schedule. Curves 70 and 72 in FIG. 2, curves 74 and 76 in FIG. 3, and curves 78 and 80 in FIG. 4 illustrate the torque developed during pre-burnish, burnish and final speed conditions.

As can be seen composition D had approximately the same effectiveness as composition X based on this test.

Composition A which showed an improvement in low frequency vibration reduction at temperatures above 250° F. was made into a brake pad and tested on the inertia dynamometer. Curves 44 and 46 in FIG. 2, curves 48 and 50 in FIG. 3 and curves 52 and 54 in FIG. 4 illustrate the torque developed during the pre-burnish, burnish and final speed conditions for compositin A. As shown in FIG. 3, although the final effectiveness for composition A is less than the base line composition X, it could have acceptable uses since the high temperature vibration frequency is essentially stable.

In order to evaluate the overall family of soft metals that could be an acceptable substitution for the sponge iron in composition X, composition A was modified through an equal volume percentage substitution of zinc for tin to produce composition E shown in FIG. 1.

Brake pads were made from composition E and tested on the inertia dynamometer in accordance with the modified SAE J843D test schedule. Curves 56 and 58 in FIG. 2, curves 60 and 62 in FIG. 3 and curves 64 and 66 in FIG. 4 illustrate the torque developed during the pre-burnish, burnish and final speed conditions.

Since aluminum powder was readibly available composition A was modified through the substitution of an equal volume percentage of aluminum powder for tin powder to produce composition F. Composition F was made into brake pads and tested on the inertia dynamometer in the same manner as composition X. Curves 32 and 34 in FIG. 2, curves 36 and 38 in FIG. 3, and curves 40 and 42 in FIG. 4 represent the torque developed during pre-burnish, burnish and final speed conditions for composition F. Composition F when compared with the base line composition X illustrated improved low speed friction or effectiveness during the final speed test as observed during the dynamometer test.

It should be evident from the information shown in FIGS. 2, 3 and 4 that composition B resulted in a substantially closer match with the frictional characteristics of composition X than any of the previously evaluated compositions.

In conclusion the test performed on the inertia dynamometer and with the test vehicle confirmed that a reduction in noise and low temperature vibration could be obtained through the addition of zinc powder to a brake lining composition and that an optimum percentage of zinc powder in a friction material composition is about 8% by volume and 14% by weight of the total compostion.

I claim:

1. A composition of matter for use as a friction material in a light weight caliper brake comprising a mixture of sponge iron, iron and copper powder, steel fiber, inorganic fillers and an elastomeric material held in a phenolic matrix, said friction material engaging another member to effect a brake applications, said friction material and other member under certain circumstances generating low frequency vibration, the improvement comprising:

an additional ingredient selected from a group consisting of aluminum, tin and zinc powders, said additional ingredient making up from 8-19% by weight of the friction material, said additional ingredient attenuating said low frequency vibrations to prevent the development of undesirable noise.

2. The composition of matter as recited in claim 1 wherein said additional metallic ingredient is zinc power, said zinc powder consisting of about 8% by weight of the friction material.

3. The composition of matter as recited in claim 2 wherein said zinc powder reduces the noise level created by said vibrations from a maximum of about 87 Db to about 80 Db in an operating temperature range up to 250° F.

4. The composition of matter as recited in claim 1 wherein said additional metallic ingredient is zinc powder, said zinc powder consisting of about 14% by weight of the friction material.

5. The composition of matter as recited in claim 4 wherein said zinc powder reduces the noise level created by said vibrations from a maximum of about 87 Db to about 75 Db in an operating temperature range up to 250° F.

6. The composition of matter as recited in claim 1 wherein said additional ingredient is tin powder, said tin powder consisting of about 19% by weight of the friction material.

7. The composition of matter as recited in claim 1 wherein said additional ingredient is aluminum powder, said aluminum powder consisting of about 8% by weight of the friction material.

* * * * *